June 18, 1935.  H. P. SMITH  2,005,568
TRACTOR MOUNTED CULTIVATOR
Filed March 30, 1934    3 Sheets-Sheet 1

Inventor
Hiram P. Smith
By V. F. Lassagne
Atty.

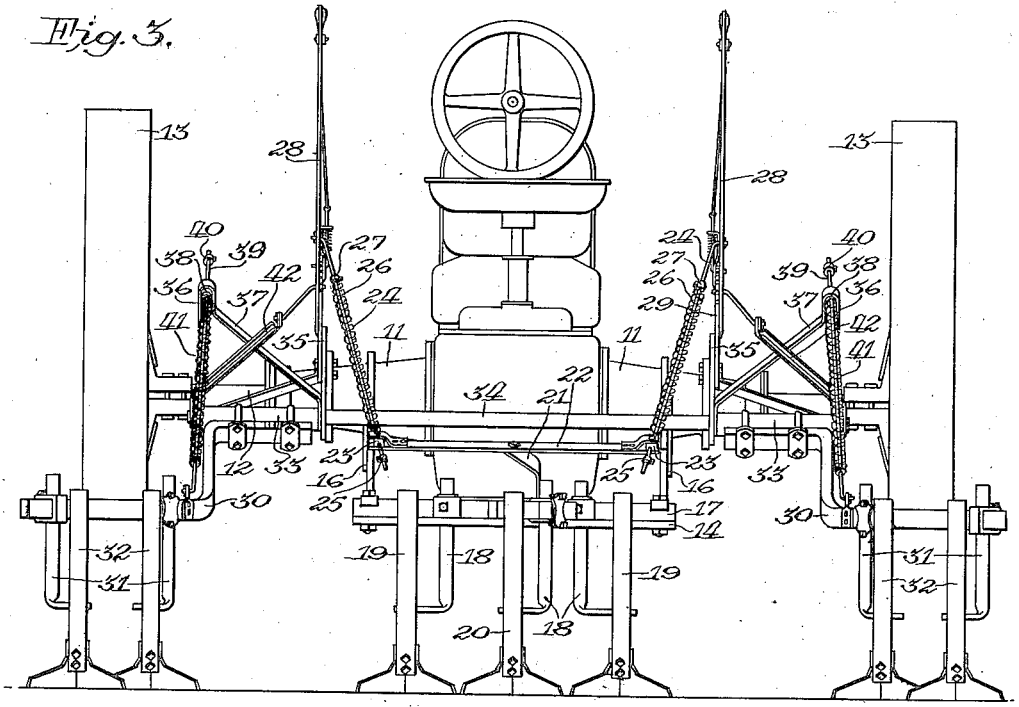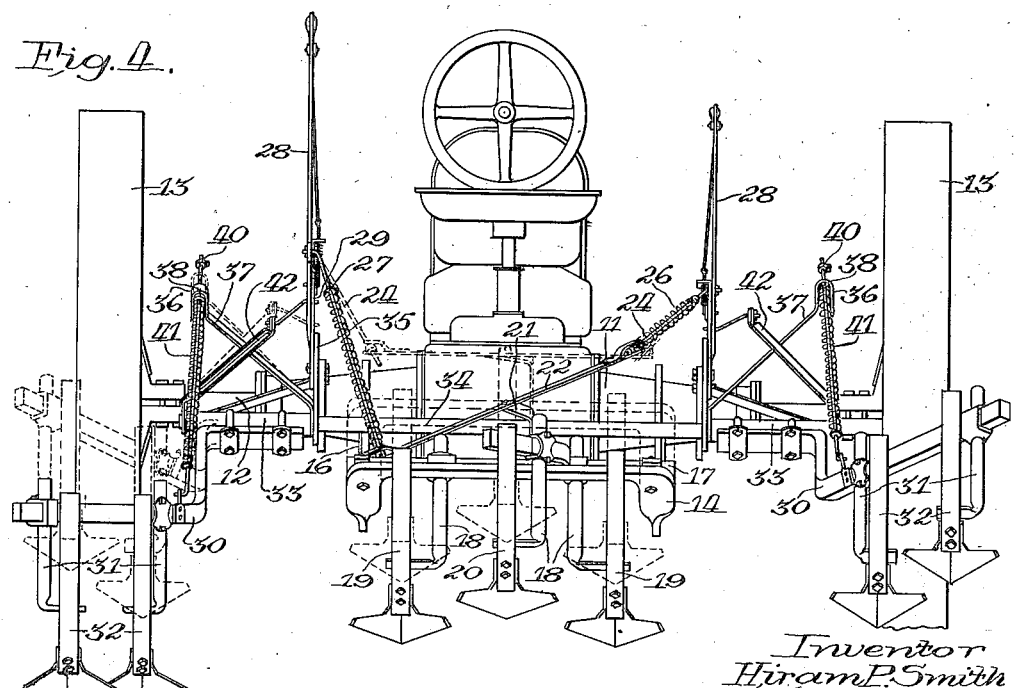

June 18, 1935.  H. P. SMITH  2,005,568
TRACTOR MOUNTED CULTIVATOR
Filed March 30, 1934  3 Sheets-Sheet 3

Inventor
Hiram P. Smith.

Patented June 18, 1935

2,005,568

UNITED STATES PATENT OFFICE 2,005,568

TRACTOR MOUNTED CULTIVATOR

Hiram P. Smith, Canton, Ill., assignor to International Harvester Company, a corporation of New Jersey Application March 30, 1934, Serial No. 718,115

14 Claims. (Cl. 97—47)

This invention relates to row crop cultivators and more particularly to lifting and lowering connections for multiple shovel gangs of a straddle row cultivator mounted on the rear end of a row crop tractor.

Row crop tractors of the wide tread type have a rear axle structure spanning the space of two plant rows of such crops as corn or cotton; and the space between rows and at each outer side of the rows is usually cultivated by means of a central and two lateral shovel gangs mounted on the axle structure. The problem presented is to divide the lifting force required to raise the three gangs equally between two lifting devices or levers, located at opposite ends of the axle structure, in order that hand operated lifts may be used which can be actuated with comparatively little effort. The principal object of the invention is, therefore, to provide lifting connections to the several gangs which will distribute the weight of the gangs in such manner as to divide the load thereof between two lift mechanisms. Another object is to provide duplicate lifting devices for a gang frame so connected to said frame through differentially acting connections as to divide the load and require successive operation of the two lifts to effect full movement of the frame, full operation of each lift imparting substantially a half movement or swing to the frame.

The above and other objects and advantages are attained by the structure hereinafter described and claimed and illustrated in the accompanying drawings, where:

Figure 3 is a rear elevation of the structure shown in Figures 1 and 2.

Figure 4 is a similar view to Figure 3 with the elements of the cultivator attachment shown in an intermediate stage of raising.

Figure 1:
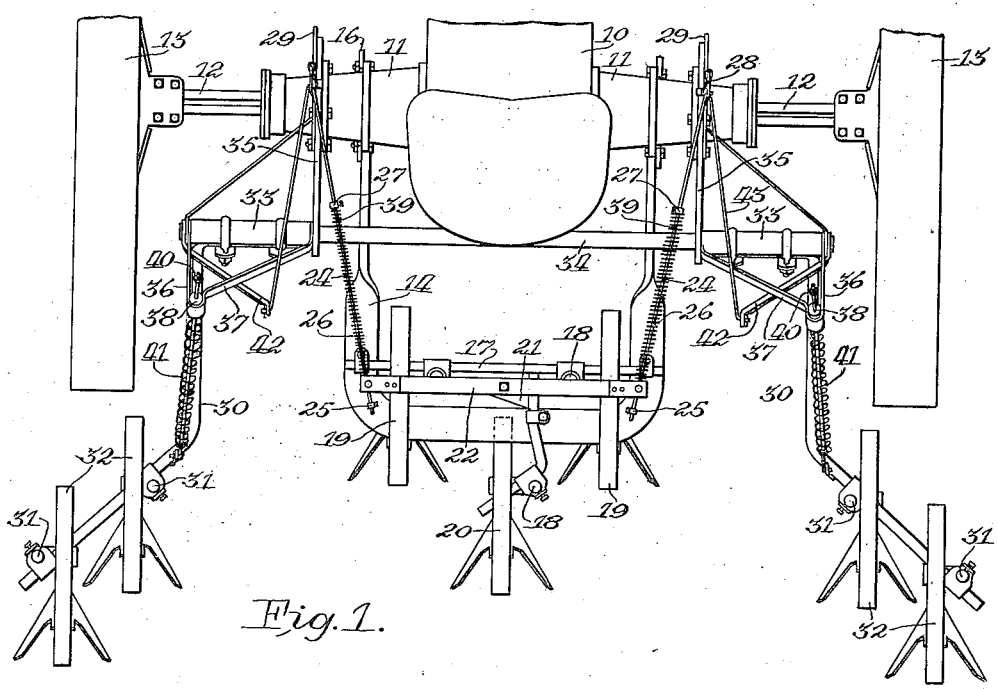
Figure 1 is a plan view of the rear axle structure of a tractor with the cultivator attachment of this invention mounted thereon.
Figure 2:
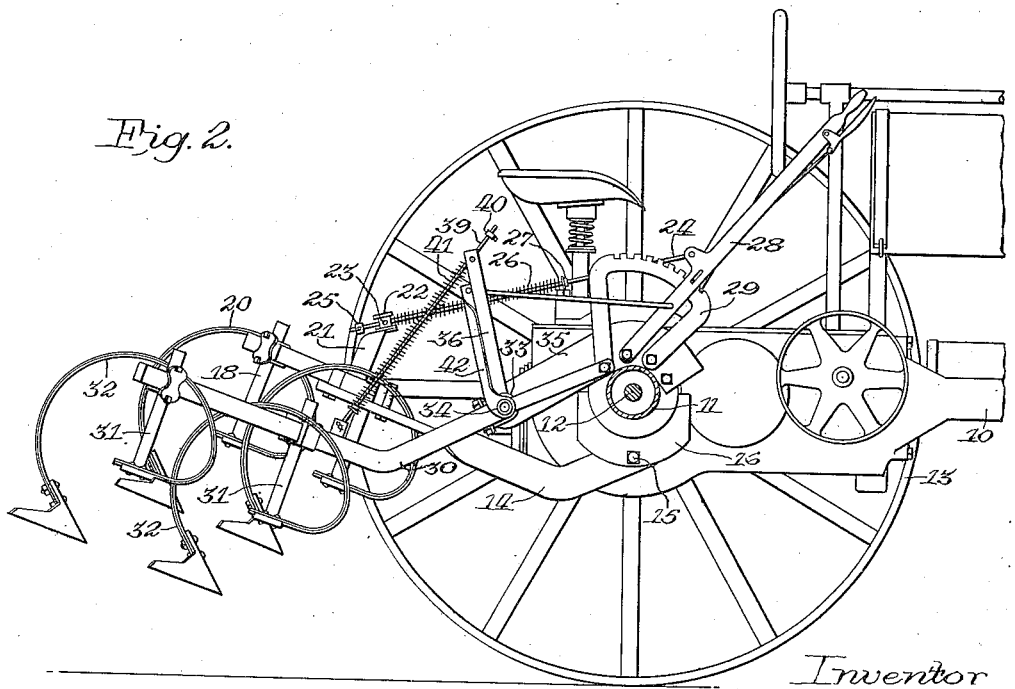
Figure 2 is a side elevation of the structure shown in Figure 1 with the near tractor wheel omitted and the cultivator attachment shown in elevated position.
Figure 5:
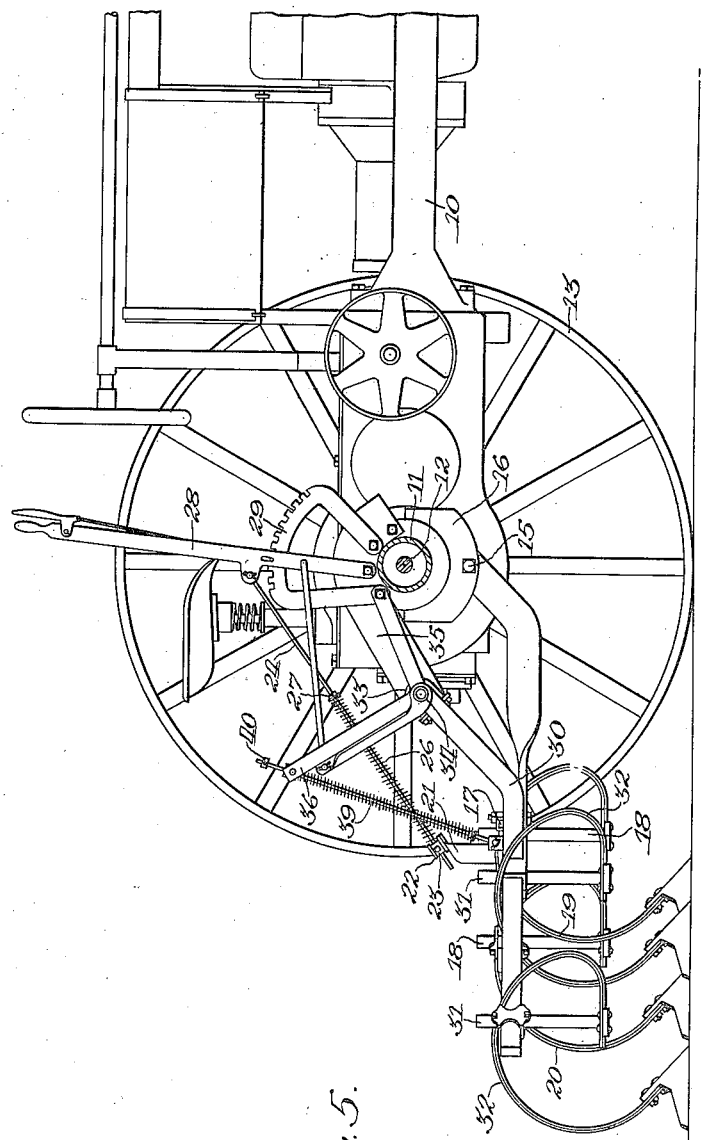
Figure 5 is a side elevation similar to Figure 2 but with the cultivator attachment in lowered position.

In the present instance the invention has been disclosed in connection with a row crop tractor comprising the usual central forwardly extending body portion 10 carrying the power plant, etc., which body is supported at the rear on an axle structure comprising laterally extending housings 11 and axle shafts 12 on which the traction wheels 13 are adjustably secured. The tread of the traction wheels is such as to span the space required for two plant rows of such crops as corn or cotton.

A cultivator attachment of this invention is composed of three separate shovel gangs arranged in straddling relation to the rows spanned by the wheels. One of the gangs is centrally mounted and the other two gangs are mounted at either side thereof in such manner as to permit the shovels carried thereby to cultivate behind the wheel treads as shown. The central gang preferably comprises a rearwardly extending U-shaped frame 14, the arms of which are pivoted at 15 to depending flanges 16 on the axle housings. The rearward portion of the frame 14 carries a rigidly secured cross bar 17, on which are adjustably mounted the standards 18 for cultivating shovels, which may be of the spring shank variety 19, shown. The bar 17 preferably carries two lateral shovels while the rear or bight portion of the frame 14 carries the standard for a rearwardly offset central shovel 20. At its center, the frame 14 is provided with a rigid upwardly extending arm 21, the upper end of which is bent to position its upper surface in a downwardly and rearwardly inclined transverse plane, on which bent end there is pivotally mounted a transversely extending equalizer bar 22. This bar is pivoted at its center to rock about an inclined axis extending longitudinally and in the transverse plane above referred to, and its ends extend substantially to the outer sides of the frame 14. At each end, the equalizer bar 22 is provided with a series of openings to adjustably receive the pivot bolt for a collar 23. The collars 23 at each end of the equalizer bar are formed with fore and aft openings to receive the lower ends of lift rods 24, which are slidable in the collars 23 and provided at their lower ends with stop nuts 25. Above the collars 23, each lifting link or rod 24 carries a coil spring 26 which is confined between the collar 23 and a stop 27 on the upper portion of the rod. The upper ends of the lifting links or rods 24 are pivotally connected to hand levers 28 mounted on the opposite end portions of the axle housing 11 and cooperating with locking racks 29 for manual adjustment in the usual manner. With the arrangement described, it will be seen that each lever 28 will act to lift and lower the frame 14 carrying the central cultivator gang through the equalizer bar 22, and that this bar will act as a differential member dividing the lifting effort between the two hand levers 28 when said levers are operated successively; that is to say, if the lever 28 on the right hand side is swung forwardly, the equalizer bar 22 will fulcrum on the lifting link of the opposite lever and a full movement of the hand lever 28 will effect a half lift of the central gang, after which actuation of the hand lever on the left side of the axle will effect the second half of the lifting movement in the same manner.

Each of the lateral gangs comprises a rearwardly extending member or beam 30, the rear end portions of which are flared outwardly to extend behind the wheels 13. These portions carry standards 31 for spring cultivator shovels 32. At their forward ends, the beams 30 are secured to transversely extended pivot brackets 33 formed with bearing sleeves journaled on the opposite ends of a transverse shaft 34 supported in rearwardly extending arms 35 mounted on the axle housing 11. Each bracket 33 has a crank arm 36 formed with a lateral brace 37, and the outer end of each crank arm 36 carries a pivot collar 38, which slidably receives the upper end of a lifting link 39 provided with the usual stop 40 at its upper end. The lower end of the link 39 is connected to the cultivator beam 30 and the usual compression spring 41 is carried on the link below the collar 38. Each bracket 33 is provided with a suitable projection or arm 42 to which a connecting link 43 is pivotally connected at its rear end, said link extending forwardly to a connection with a hand lever 28. By this manner of mounting the lateral gangs, the lifting and lowering thereof is accomplished by the same levers as lift the central gang and the full movement of each hand lever will be communicated to its associated lateral gang.

With the construction and arrangement above described, it will be seen that each hand lever 28 is directly connected to one of the pivot brackets 33 supporting one lateral gang and will lift and lower same in the usual way, while at the same time the actuation of each hand lever will impart a partial lifting movement to the central gang. The steps of the lifting operation have been illustrated in Figure 4, where the parts are illustrated in full lines in the positions they will assume when the right hand lever has been swung forward to lift the right hand lateral gang and half lift the central gang. Subsequent corresponding movement of the left hand lever 28 will move the left hand lateral gang and complete raising of the central gang to the dotted line position shown in that figure. The structure is one, therefore, in which the effort necessary to raise the attachment as a whole is evenly divided between two lifting devices or hand levers.

While the above construction illustrates a preferred embodiment of the invention, the details of construction described are not essential and may be varied without departure from the scope of the invention as defined in the following claims.

What is claimed is:

1. A cultivator comprising a supporting structure, an implement frame connected to the supporting structure for vertical movement, a horizontally disposed bar pivoted at its center on the implement frame and rocking in a plane extending across the frame, a lifting and lowering device mounted on the supporting structure above each end of the horizontally disposed bar, and a lift connection between each end of said bar and the lifting and lowering device thereabove.

2. A cultivator comprising a supporting structure, an implement frame connected to the supporting structure for vertical movement, a horizontally disposed bar pivoted at its center to the implement frame on an inclined axis extending longitudinally of the frame, a lifting and lowering device mounted on the supporting structure above each end of the horizontally disposed bar, and a lifting link pivotally connecting each end of the bar to the lifting and lowering device thereabove.

3. A straddle-row cultivator comprising a wheel supported axle structure, a central cultivator gang and lateral cultivator gangs at each side thereof, each gang separately pivotally mounted on the axle structure for lifting and lowering, duplicate lifting devices on the axle structure, each device connected to the central gang and to one of the lateral gangs respectively, and means comprised in the connections for imparting substantially half as much movement to the central gang as is imparted to a lateral gang by actuation of each lifting device.

4. A straddle-row cultivator comprising a wheel supported axle structure, a central cultivator gang including a transversely extending pivoted member, a lateral gang at each side of the central gang, means pivotally connecting each gang to the axle structure for lifting and lowering movement, duplicate lifting devices respectively mounted on the opposite outer portions of the axle structure and each connected to one of the lateral gangs and to the adjacent end of the transverse pivoted member on the central gang, and differentially acting means comprised in the connections for partially lifting or lowering the central gang as a lateral gang is fully raised or lowered.

5. A straddle-row cultivator comprising a wheel supported axle structure, a central cultivator gang and lateral cultivator gangs at each side thereof, means connecting each gang to the axle structure for lifting and lowering movements, duplicate lifting devices each mounted on the axle structure at one side of the central gang, lifting connections between each lifting device and one of the lateral gangs, and lifting connections between each lifting device and the central gang including differentially acting means for dividing the lift of the central gang between the two lifting devices.

6. A straddle-row cultivator comprising a wheel supported axle structure, a central rearwardly extending frame pivotally connected to said axle structure for movement vertically and carrying a cultivator gang, lateral rearwardly extending cultivator beams pivotally connected on the axle structure at each side of said central frame, a lift lever mounted on each side of the axle structure and connected to one lateral cultivator beam, a centrally pivoted transverse rocking equalizer bar on the central frame, and a lifting link connecting each lever with the end of the equalizer bar adjacent thereto.

7. The combination with the rear axle housing of a wide tread tractor, of a straddle-row cultivator attachment comprising a central cultivator gang having its carrying frame pivotally connected to the central portion of the axle housing for movement vertically, a pair of aligned rockshafts journaled in brackets secured to the axle housing above said central gang, a lateral cultivator gang at each side of the central gang having supports secured to the respective rockshafts, independently operable lift mechanisms mounted on the axle housing at each side of the central gang and connected to the respective rockshafts for lifting and lowering the lateral gangs by rocking said shafts, and lifting connections between the carrying frame of the central gang and said lifting devices including a centrally pivoted equalizer bar on the carrying frame having its ends connected to the respective lifting devices.

8. A cultivator comprising a supporting structure, an implement frame pivoted to the supporting structure for vertical movement, equalizing means pivoted on the implement frame and oscillating in a plane extending across the frame, lifting and lowering devices mounted on the supporting structure above said means, and lift connections between said equalizing means and the lifting and lowering devices thereabove.

9. A cultivator comprising a supporting structure, an implement frame pivoted to the supporting structure for vertical movement, lifting and lowering devices mounted on the supporting structure above said implement frame, and means connecting said implement frame and said lifting and lowering devices for imparting to the implement frame substantially half the movement imparted to each of said lifting and lowering devices.

10. A straddle-row cultivator comprising a wheel supported axle structure, a central implement frame and laterally spaced implement frames at each side thereof, each frame separately pivotally mounted on the axle structure for lifting and lowering, lifting and lowering devices on the axle structure, and means connecting said implement frames and said lifting and lowering devices whereby said central implement frame will have imparted thereto substantially half as much movement as is imparted to the laterally spaced frames by the actuation of each lifting device.

11. A straddle-row cultivator comprising a wheel supported structure, a central cultivator gang and lateral cultivator gangs at each side thereof, each gang separately pivotally mounted on the axle structure for lifting and lowering, duplicate lifting devices on the axle structure connected to the central gang and to the lateral gangs respectively, and means comprised in the connections for imparting substantially half as much movement to the central gang as is imparted to a lateral gang by actuation of each lifting device.

12. A cultivator attachment for tractors having a rear axle housing, said attachment comprising a central implement frame and laterally spaced implement frames at each side thereof mounted for vertical adjustment, means for attaching said attachment to the aforesaid rear axle housing, lifting and lowering devices removably attached to said rear axle housing, and means connecting said implement frames and said lifting and lowering devices whereby said central implement frame will have imparted thereto substantially half as much movement as is imparted to the laterally spaced frames by the actuation of each lifting device.

13. A cultivator attachment for tractors having a rear axle housing, said attachment comprising a central implement frame and laterally spaced implement frames at each side thereof mounted for vertical adjustment, means for attaching said attachment to the aforesaid rear axle housing, lifting and lowering devices removably attached to said rear axle housing, laterally extending equalizing means pivoted on the central implement frame and oscillating in a plane extending across the frame, and lifting links pivotally connecting said lifting and lowering devices to the aforesaid equalizing means at each end thereof and also to the laterally spaced implement frames, whereby said central implement frame will have imparted thereto substantially half as much movement as is imparted to the laterally spaced frames by the actuation of each lifting device.

14. A cultivator attachment for tractors having a rear axle housing, said attachment comprising a central implement frame and laterally spaced implement frames at each side thereof mounted for vertical adjustment, means for attaching said attachment to the aforesaid rear axle housing, lifting and lowering devices removably attached to said rear axle housing, laterally extending equalizing means pivoted to the central implement frame and oscillating in a plane extending across the frame, lifting links pivotally and slidably connecting said lifting and lowering devices to the aforesaid equalizing means at each end thereof and also to the laterally spaced implement frames, and resilient means mounted on said lifting links and pressing on said frames when lowered, whereby said central implement frame will have imparted thereto substantially half as much movement as is imparted to the laterally spaced frames by the actuation of each lowering device when said implement frames are lowered into working position.

HIRAM P. SMITH.